United States Patent [19]

Matthews et al.

[11] Patent Number: 5,211,451
[45] Date of Patent: May 18, 1993

[54] ADJUSTABLE REGULATING DEVICE FOR A RAILWAY LOCOMOTIVE BRAKE VALVE APPARATUS

[75] Inventors: Alvin J. Matthews, Pittsburgh; Thomas M. Hartzell, Wilmerding, both of Pa.

[73] Assignee: Westinghouse Air Brake Company, Wilmerding, Pa.

[21] Appl. No.: 884,304

[22] Filed: May 11, 1992

Related U.S. Application Data

[63] Continuation of Ser. No. 587,408, Sep. 25, 1990, abandoned.

[51] Int. Cl.⁵ .............................................. B60T 17/20
[52] U.S. Cl. ........................................ 303/51; 403/19; 403/343
[58] Field of Search ...................... 303/50, 51; 403/19, 403/343

[56] References Cited

U.S. PATENT DOCUMENTS

| | | | |
|---|---|---|---|
| 1,229,837 | 6/1917 | Waugh | 403/19 |
| 2,483,660 | 10/1949 | Morris et al. | 403/19 X |
| 2,886,975 | 11/1956 | Murray | 403/19 X |
| 2,905,507 | 5/1956 | May | 303/50 |
| 2,958,561 | 11/1960 | May | 303/8 |
| 3,504,950 | 4/1970 | McClure | 303/35 |

OTHER PUBLICATIONS

"30-CDW Brake Valve Operation and Updating", Dale A. Chovan: presented at the Air Brake Association Annual Technical Conference Sep. 18, 1989.

Primary Examiner—Robert J. Oberleitner
Assistant Examiner—Lee W. Young
Attorney, Agent, or Firm—J. O. Ray, Jr.

[57] ABSTRACT

A valve spring housing for use in an adjustable regulating valve device of a railway locomotive brake valve has a cylindrical body with first, second and third sections. The first section has an outer cylindrical surface of a uninterrupted curvature, which first section can be threadedly secured to a valve pin housing, a recess to accept the end of a spiral spring, and a first flange extending radially outwardly therefrom. The second section has a convex surface on the end thereof and a second flange extending radially outwardly therefrom. The intermediate section is disposed between the first and second flanges and seats a sealing member between the flanges. A torquing tool acceptor, such as a transverse passageway is provided on the second section to enable threaded securement of the valve spring housing to a valve pin housing of a valve pin assembly in assembling the adjustable regulating valve device.

11 Claims, 3 Drawing Sheets

ADJUSTABLE REGULATING DEVICE FOR A RAILWAY LOCOMOTIVE BRAKE VALVE APPARATUS

This is a continuation of application Ser. No. 07/587,408 filed Sep. 25, 1990, now abandoned.

FIELD OF THE INVENTION

The present invention relates, in general, to brake equipment used on railway-type locomotives, and, more particularly, this invention relates to a manually adjustable regulating valve assembly which forms a portion of such brake equipment and enables the desired normal full charge, pressure value in a equalizing reservoir and the brake pipe.

BACKGROUND OF THE INVENTION

Manually adjustable regulating valve devices for use in railway-type locomotive brake valve equipment have been known from the prior art prior to the present invention. See, for example, U.S. Pat. Nos. 2,958,561, issued Nov. 1, 1960, to Harry C. May and 3,504,950, issued Apr. 7, 1970, to Glenn T. McClure and assigned to the assignee of the present invention. Also of interest to the present invention is a paper titled, "30-CDW Brake Valve Operation and Updating", prepared by Dale A. Chovan, for presentation at The Air Brake Association Annual Technical Conference held on Sep. 18, 1989 in Chicago, Ill. The teachings in each of the above-identified references is incorporated herein by reference thereto.

The locomotive brake valve equipment taught in FIG. 1A of U.S. Pat. No. 2,958,561 includes a sectionalized casing which contains therein a relay valve device, a self-lapping control valve device (adjustable regulating valve), a brake pipe cut-off valve device, a vent valve device, an emergency valve device, a suppression valve device and an equalizing reservoir cut-off valve device. The operation of such self-lapping control valve device, vent valve device, emergency valve device and suppression valve device is controlled respectively by cams. Such cams are spaced axially along and rotatably connected to a cam shaft. The cam shaft is rotatably supported by the casing and, in turn, is rotatably connected to an arcuately moveable brake valve handle. The self-lapping control valve device includes a diaphragm-type piston which is subject on a first side thereof to fluid pressure in a chamber and on a second side thereof to pressure exerted by a helical regulating spring housed in an atmospheric chamber. Such regulating spring is arranged so that it can be manually adjusted from outside the casing as necessary by means of an adjusting screw which adjusts the relative position of a spring retainer seated against such regulating spring. The degree of compression of the regulating spring is adjusted such that the regulating spring will reload the diaphragm piston to a degree that corresponds to the desired full charge pressure value of the equalizing reservoir pressure, and hence of the brake pipe pressure as is understood in the railway braking art. Axially arranged with the diaphragm piston is a main cylindrical slide valve. Such slide valve is sealingly slideable within a bore formed in the cavity. Such bore is open at one end into a first chamber and at an opposite end into a second chamber that is connected to the atmosphere via a vent port. An auxiliary slide valve is telescopingly slideable within a coaxially arranged bore through such main slide valve. A helical spring positioned in such first chamber biases the auxiliary slide valve into contact with the second chamber side of the diaphragm piston. Such spring is backed up by a follower member that is positively connected to the main slide valve and engages a cam so that the position of such main slide valve will be controlled according to the rotational position of the moveable brake valve handle.

The locomotive brake valve apparatus taught in FIG. 2 of U.S. Pat. No. 3,504,950 includes essentially the same components taught in U.S. Pat. No. 2,958,561. Each of these locomotive brake valves is known in the industry as a 26 type brake valve. It can be noted that the self-lapping central valve device used in the '950 reference is a poppet type valve as opposed to the slide valve type used in the '561 reference.

The advanced locomotive brake valve apparatus discussed in the Chovan reference is a now conventional type brake valve apparatus designated 30-CDW in the railway industry. For example, in FIG. 1, in drawing no. 0582799 following page 51, a diagrammatic view of the 30 CDW brake valve is shown, while FIG. 1, on page 8 shows an exploded view of parts of the brake valve. Specific attention is drawn to part no. 1-64 of FIG. 1, which illustrates a regulating and inlet valve unit, to which the present invention is specifically directed.

The adjustable regulating valve device used in the railway locomotive valve apparatus includes a pin housing and a valve spring housing which are threadedly engaged to seal those two components together and enclose a valve pin, spring end enclosure, and a spiral spring. In assembly of the adjustable regulating valve device, an initial threaded engagement of the pin housing and valve spring housing is effected and the assembled unit initially bench tested for leakage. While assembled units have often passed the initial bench test, upon placement into a railway locomotive brake valve, some such assembled units, for some unexplained reason, have shown leakage, which has required the time consuming and expensive removal of the adjustable regulating valve from the railway locomotive brake valve apparatus for disassembly and reassembly for a further leakage test.

It is an object of the present invention to provide an adjustable regulating valve device for a railway locomotive valve apparatus that is readily assembled and which does not result in leakage following initial bench testing.

It is another object of the present invention to provide a valve spring housing that, when threadedly engaged with a pin housing does not result in leakage therebetween following initial bench testing.

SUMMARY OF THE INVENTION

An adjustable regulating valve device for a railway locomotive brake valve apparatus has a valve pin assembly and a valve spring housing that is threadedly engaged with a valve pin housing of the valve pin assembly.

The valve pin assembly includes a valve pin housing having a cavity extending from a first open end thereof to a valve seat in the end wall forming the cavity, with a truncated conical shaped second end having a bore therethrough communicating with the housing cavity. A pair of spaced radially outwardly extending flanges on the pin housing form a groove therebetween for securement therein of a pin housing sealing member. A valve pin extends through the bore of the second end from the cavity and has a sealing portion which seats in the valve seat, while a spring enclosure contacts the end of the pin within the pin housing to enclose one end of a spiral spring.

The valve spring housing comprises a cylindrical body having a first section, a second section, and an intermediate third section. The first section has an outer cylindrical surface of uninterrupted curvature and a first end with a threaded recess which is threadedly engageable with threads o the outer surface of the pin housing. The recess forms a ring-shaped wall portion having internal threads and a bottom wall, with means on the bottom wall for seating a spring therein. A first radially outwardly extending flange is provided on the outer surface of the first section spaced from the first end thereof. The second section has a second end having a convex surface thereon, and a second radially outwardly extending flange on the outer surface spaced from the second end thereof, which confronts the first flange. The intermediate third section is disposed between the first and second flanges and accepts a sealing member therein. A spiral spring is provided in the pin housing and threadedly secured valve spring housing with one end disposed in the spring end enclosure in the cavity of the valve pin housing and the other end disposed in the means for seating the spring in the bottom wall of the valve spring housing, such that the spiral spring is compressed to bias the sealing portion of the valve pin into engagement with the valve seat of the pin housing.

BRIEF DESCRIPTION OF THE INVENTION

Figure 1:
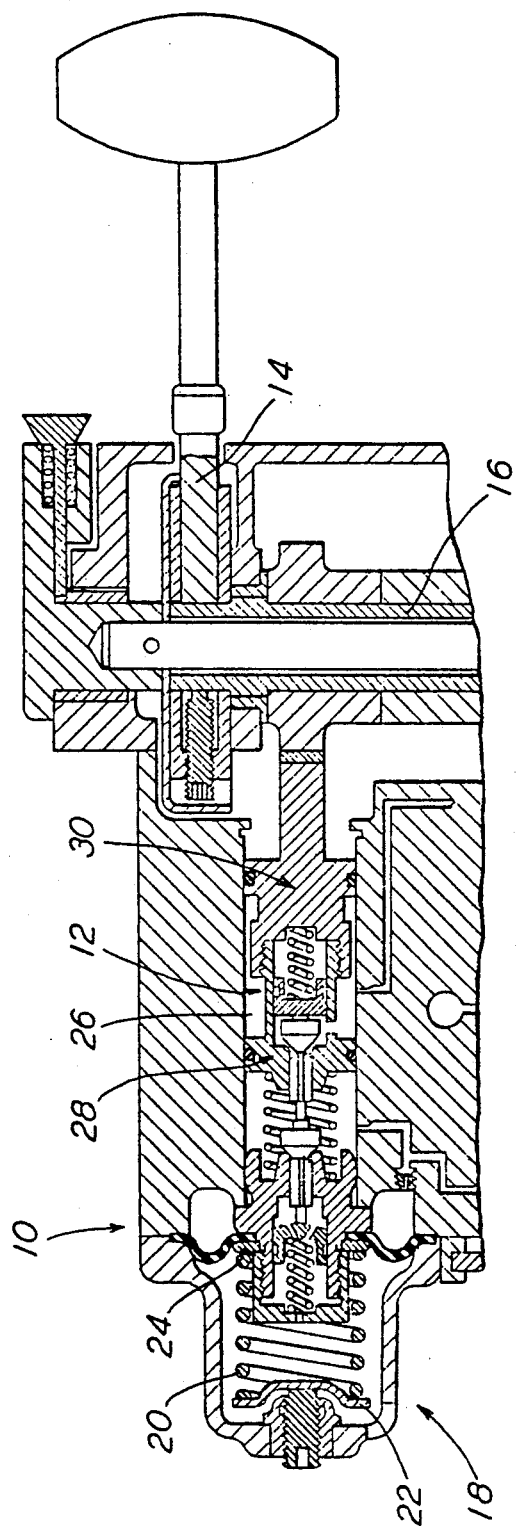
FIG. 1 is an enlarged diagrammatic view, partly in section of a portion of a railway locomotive brake valve apparatus in which the adjustable regulating valve device of the present invention is used, showing a conventional such valve device in place.

Prior to proceeding to the more detailed description of the present invention, it should be noted that in each of the several views which are illustrated in the attached drawings, identical components which have identical functions have been identified, for the sake of clarity, with identical reference numerals.

Referring now to FIG. 1, a conventional automatic brake valve apparatus 10 is illustrated which contains a conventional adjustable regulating valve device 12. The automatic brake valve device is known and need not be specifically described in detail, but briefly contains a brake valve handle 14 and cam shaft 16, and a control valve device 18. The force of a regulating spring 20 may be movably adjusted by use of an adjusting screw (not shown) that adjusts the position of a spring seat 22 so as to preload a diaphragm-type piston 24 to a degree corresponding to a desired normal full charge value of an equalizing reservoir (not shown) and therefore, a brake pipe, as will be understood by those skilled in the art. Thus, the control valve device will provide in its delivery chamber 26 a desired normal pressure.

Included as part of the control valve device, in the chamber 26, is the adjustable regulating valve 12, which is comprised of a valve pin assembly 28 and threadedly engaged valve spring housing 30, to which the present invention specifically applies.

Figure 2:
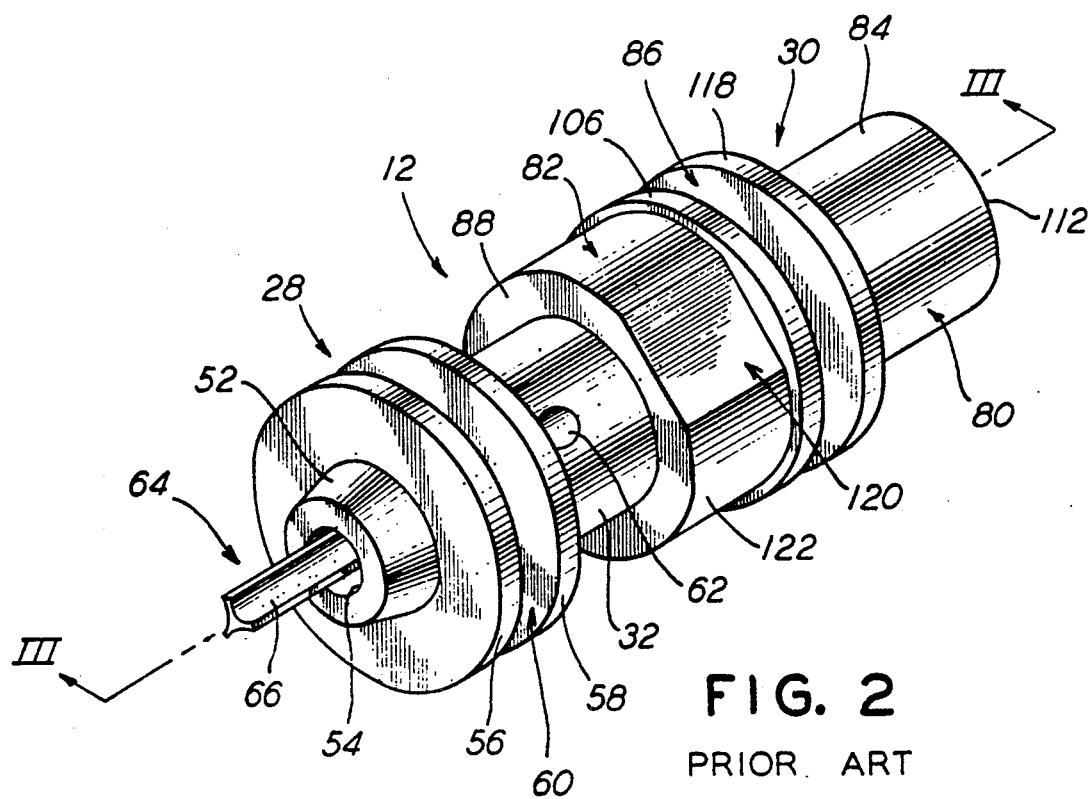
FIG. 2 is a perspective view of a conventional adjustable regulating valve device such as is used in the railway locomotive brake valve apparatus illustrated in FIG. 1.
Figure 3:
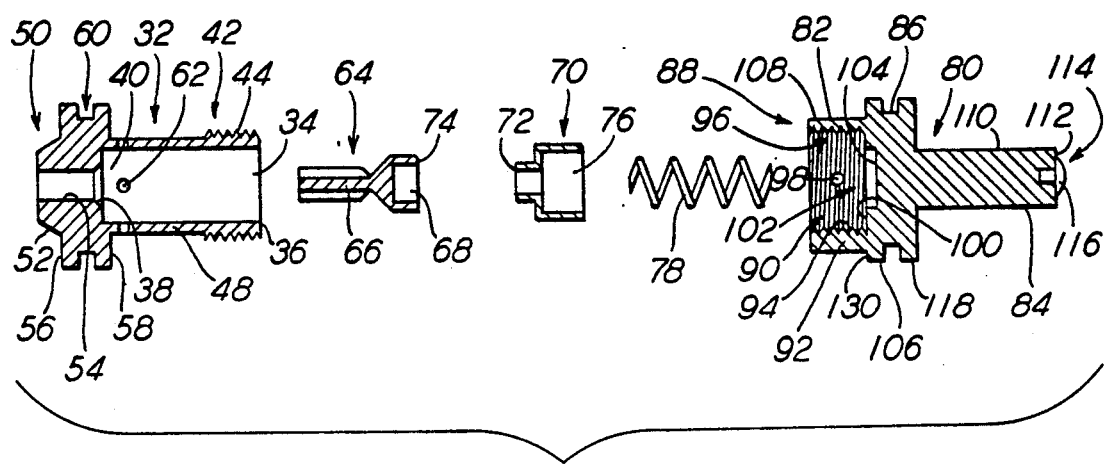
FIG. 3 is an exploded view of the conventional adjustable regulating valve device, in cross-section, taken along lines III—III of FIG. 2.

A conventional adjustable regulating valve device 12 for a railway locomotive brake apparatus is shown assembled in perspective view in FIG. 2, and in an exploded cross-sectional view in FIG. 3. The adjustable regulating valve device 12 is formed from a valve pin assembly 28 that is threadedly engaged with a valve spring housing 30.

The valve pin assembly 28 comprises a cylindrical shaped pin housing 32 which has a cavity 34, therein that extends from a first open end 36 to a valve seat 38, which is formed in an end wall 40 forming the cavity 34. Adjacent the open end 36, there is provided a threaded portion 42, with threads 44 on the outer surface 46 of the wall 48 of pin housing 32. At the other or second end 50 of the pin housing 32, there is provided a truncated conical-shaped portion 52 which has a bore 54 therethrough which communicates with the cavity 34. The pin housing 32 has a pair of spaced circular flanges 56, 58 extending radially outwardly therefrom which have a groove 60 therebetween for securement of a pin housing sealing member, such as an O-ring. Spaced apertures 62 are provided through the wall 48 of the pin housing. The pin assembly is provided with a reciprocable valve pin 64 having a pin element 66 and seating portion 68, which is adapted to seat in the valve seat 38 of the pin housing 32, with the pin element 66 extending axially through and from the bore 54 of the pin housing 32. A spring end enclosure 70 is provided in the valve pin assembly 28, one end 72 of which contacts the rear surface 74 of the valve pin 64, and has a receptacle 76 to enclose a spiral spring 78 when the adjustable regulating valve 12 is assembled.

The valve spring housing 30 comprises a cylindrical body 80 having a first section 82 of a predetermined diameter, a second section 84 of a reduced diameter, and an intermediate third section 86. The first section 82 has a first end 88 with a recess 90 therein formed by a ring-shaped wall portion 92 that has threads 94 on the inner surface 96 thereof, the threads 94 threadedly engageable with threads 44 on the outer surface 46 of the wall 48 of the pin housing 32. An aperture 98 may be provided through ring-shaped wall portion 92. A bottom wall 100, along with ring-shaped portion 92, forms the- recess 90, and the bottom wall 100 has means 102 for seating a spring therein, such as a hollow 104 formed in the bottom wall 100. A radially outwardly extending first flange 106 is provided on the outer surface 108 of the first section 82 spaced from the first end 88. The second section 84 has an outer surface 110 and a second end 112, with a convex surface 114 on the second end, which convex surface may be formed by a striker pin head 116 secured to the second end 112. A radially outwardly extending- second flange 118 is provided on the outer surface 108 of the second section 84 spaced from the second end 112. The intermediate third section 86 is disposed between the first flange 106 and the confronting second flange 118 and is adapted to seat a sealing member, such as an O-ring, between those two flanges 106 and 118.

As illustrated in FIG. 2, the outer surface 108 of the first section 82 was shaped so as to have opposed flat surface sections 120 (only one of which is visible in FIG. 2), which interrupted the curvature of the outer cylindrical surface 122. These flat surface sections 120 were provided so that upon threading the valve spring housing on to the valve pin assembly, a wrench or other torquing means could be used to tighten the threaded engagement of those two components, the valve spring housing 30 and the valve pin housing 32, to prevent leakage from the assembled adjustable regulating valve device 12. As previously described however, with such a construction, some leakage was still found to occur, even following an initial successful bench test.

Figure 4:
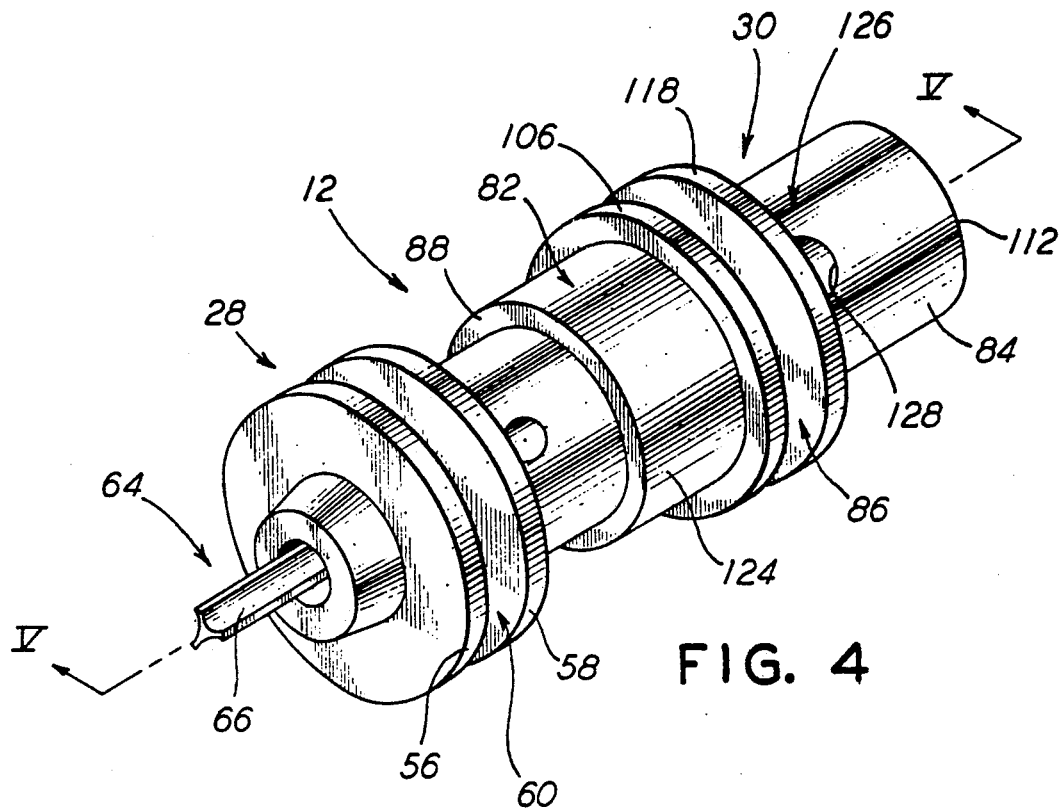
FIG. 4 is a perspective view of the adjustable regulating valve device of the present invention.
Figure 5:
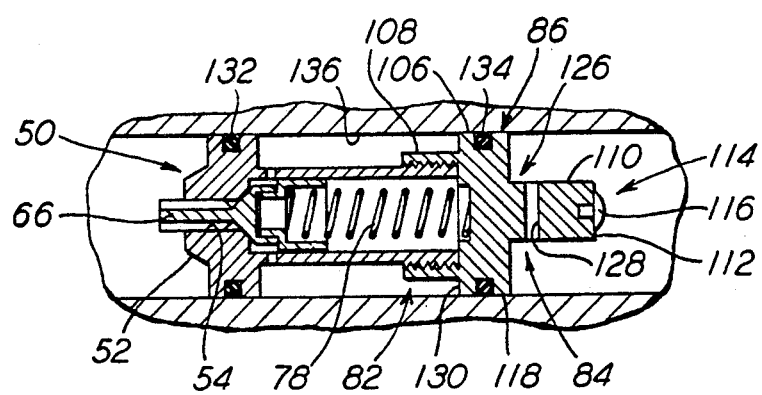
FIG. 5 is a cross-sectional view of the adjustable regulating valve device of the present invention taken along lines V—V of FIG. 4.

According to the present invention, illustrated in FIGS. 4 and 5, a construction has been designed that substantially reduces the instances of leakage found in the prior art construction of adjustable regulating valve devices for a railway locomotive brake valve apparatus. As shown in FIG. 4, according to the present invention, the first section 82 of the cylindrical body 80 of the valve spring housing 30 is provided with an outer cylindrical surface 124 of an uninterrupted curvature. With this uninterrupted curvature of the outer cylindrical surface 124 of the first section 82 of the cylindrical body 80, for some reason, as yet unknown, the instances of leakage were substantially reduced as compared with the prior art adjustably regulating valve devices.

With this provision of an uninterrupted curvature on the outer cylindrical surface 124 of the first section 82, that surface is not readily usable for application of a torquing tool thereto to threadedly engage the valve spring housing and the pin housing 32. Thus, a torquing tool acceptor 126 is provided on the second section 84 of the cylindrical body 80 of the valve spring housing 30, illustrated as a passageway 128 formed transversely through the second section 84. This passageway 128 is adapted to accept a shaft or key (not shown) which will provide rotation of the valve spring housing 30 to threadedly engage the same with the pin housing 32 and enable application of torquing force to tighten those two components together in sealed relationship. As can be seen in FIGS. 4 and 5, the cylindrical surface 124 has a substantial width which may be approximately equal to the extent of the threads 44 or the threads 94.

In addition to solving the problem of leakage, the present invention enables the formation of the valve spring housing 30 using less material and thus reducing the cost. For example, a conventional valve spring housing 30 generally had a first section 82 on the cylindrical body 80 having an outer diameter of about 0.770 inch, with the diameter of the recess 90 being about 0.5625 inch, thus providing a wall thickness of the wall portion 92 of about 0.1037 inch. At the flattened sections, the outer diameter was about 0.680 inch. In the present invention, the wall thickness may be retained as previously described. In a preferred embodiment, however, the outer diameter of the first section 82 is only about 0.656 inch, with the diameter of the recess 90 the same as in conventional such devices, which provides a wall thickness of the wall portion 92 of only about 0.047 inch, a significant reduction in the thickness required in the wall portion 92.

This reduction in the wall thickness of the wall portion 92 requires a use of less material and, since the flange 106 has the same diameter as the flange on a conventional valve spring housing, provides a larger flange surface 130 facing the pin housing 32 when the valve spring housing 30 and pin housing 32 are assembled.

In FIG. 5, the adjustable regulating valve device is shown in place in a chamber 26 of a locomotive brake valve illustrating the placement of O-rings 132 and 134 as sealing members between the pin housing 32 and the wall 136 forming the chamber and between the valve spring housing 30 and said wall.

What is claimed is:

1. A valve spring house for a regulator valve of a railway locomotive brake valve apparatus comprising:
   a cylindrical body having a first section of a predetermined diameter, a second section of a reduced diameter, and an intermediate third section;
   said first section having an outer cylindrical surface of an uninterrupted curvature and of a substantial width, and a first end, with a threaded recess in said first end which forms a ring-shaped wall portion having a threaded inner surface and a bottom wall, the width of said outer cylindrical surface being substantially equivalent to the extent of said threaded inner surface, the bottom wall having means for seating a spring therein, and a radially outwardly extending first flange on the outer surface of said first section spaced from said first end;
   said second section having an outer surface and a second end, with a convex surface on said second end, and a radially outwardly extending second flange on the outer surface of said second section spaced from said second end and confronting said first flange,
   said intermediate third section disposed between said confronting first and second flanges and adapted to seat a sealing member therebetween, of securement therein of a valve spring housing sealing member.

2. A valve spring housing for a regulator valve of a railway locomotive brake valve apparatus as defined in claim 1, wherein a torquing tool acceptor is provided on the second section of said cylindrical body.

3. A valve spring housing for a regulator valve of a railway locomotive brake valve apparatus as defined in claim 2, wherein said torquing tool acceptor comprises a passageway formed transversely through said second section of said cylindrical body.

4. A valve spring housing for a regulator valve of a railway locomotive brake valve apparatus as defined in claim 1, wherein said means for seating a spring in the bottom wall of said first section comprises a hollow formed in said bottom wall.

5. A valve spring housing for a regulator valve of a railway locomotive brake valve apparatus as defined in claim 1, wherein the convex surface on said second end comprises a striker pin head secured to said second end.

6. An adjustable regulating valve device for a railway locomotive brake valve apparatus comprising:
   a valve pin assembly;
   said valve pin assembly comprising a cylindrical-shaped pin housing having a cavity therein extending from a first open end to a valve seat in an end wall forming said cavity, an outer threaded portion adjacent said open end, a truncated conical shaped second end with a bore therethrough communicating with the cavity of said pin housing, a spaced pair of circular flanges on said pin housing having a groove therebetween for securement therein of a pin housing sealing member; a valve pin extending through the bore of said second end having a seating portion which seats in said valve seat, and a spring enclosure disposed in said cavity and in contact with said valve pin adapted to enclose one end of spiral spring;

a valve spring housing threadedly engaged with the valve pin housing of said valve pin assembly;

said valve spring housing comprising a cylindrical body, having a first section of predetermined diameter, a second section of a reduced diameter, and intermediate third section; said first section having an outer cylindrical surface of an uninterrupted curvature, and of a substantial width and a first end, with a threaded recess in said first end which forms a ring shaped wall portion having a thread inner surface and a bottom wall, the width of said outer cylindrical surface being substantially equivalent to the extend of said threaded inner surface, the bottom wall having means for seating a spring therein, and a radially outwardly extending first flange on the outer surface of said first section spaced from said first end; said second section flange on the outer surface of said second section spaced from said second end, and confronting said first flange; said intermediate third section disposed between said confronting first and second flanges and adapted to seat a sealing member therebetween, for securement therein of a valve spring housing sealing member; and a spiral spring, one end of which is disposed in the spring and enclosure disposed in the cavity of said valve pin housing and the other end od which engages with the means for seating a spring in the bottom wall in said valve spring housing; with the outer threaded portion of said pin housing threadedly engaged with the threaded inner surface of the first section of the cylindrical body of said valve spring housing to compress said spiral spring and bias the seating portion of said valve pin into engagement with said valve seat.

7. An adjustable regulating valve device for a railway locomotive brake valve apparatus as defined in claim 6, wherein a torquing tool acceptor is provided on the second section of the cylindrical body of said valve spring housing.

8. An adjustable regulating valve device for a railway locomotive brake valve apparatus as defined in claim 7, wherein said torquing tool acceptor comprises a passageway formed transversely through the second section of the cylindrical body of said valve spring housing.

9. An adjustable regulating valve device for a railway locomotive brake valve apparatus as defined in claim 6, wherein the means for seating said spring in the bottom wall of the first section of the cylindrical body of said valve spring housing comprises a hollow formed in the bottom wall of said first section.

10. An adjustable regulating valve device for a railway locomotive brake valve apparatus as defined in claim 6, wherein the convex surface on the second end of the second section of the cylindrical body of said valve spring housing comprises a striker pin head secured to said second end.

11. An adjustable regulating valve device for a railway locomotive brake valve apparatus as defined in claim 6, including a pin housing sealing member comprising an O-ring secured in the groove between the spaced pair of circular flanges on said pin housing, and a valve spring housing sealing member comprising an O-ring seated on said intermediate third section of the cylindrical body of said valve spring housing and secured between said confronting first and second flanges.

* * * * *

UNITED STATES PATENT AND TRADEMARK OFFICE
CERTIFICATE OF CORRECTION

PATENT NO. : 5,211,451

DATED : May 18, 1993

INVENTOR(S) : Alvin J. Matthews et al.

It is certified that error appears in the above-identified patent and that said Letters Patent is hereby corrected as shown below:

Column 2, line 45, delete "cf" and insert --of--.

Column 3, line 11, delete "o" and insert --on--.

Column 4, line 55, delete "-";

Column 4, line 64, delete "-".

Column 5, line 61, delete ",", first occurence.

Signed and Sealed this

Twenty-second Day of February, 1994

Attest:

BRUCE LEHMAN

*Attesting Officer*    *Commissioner of Patents and Trademarks*